May 25, 1943. L. K. MAULSBY ET AL 2,319,820
NUT CRACKING MACHINE
Filed March 5, 1942 3 Sheets-Sheet 1

INVENTORS
Leon K. Maulsby
John A. M. Swann

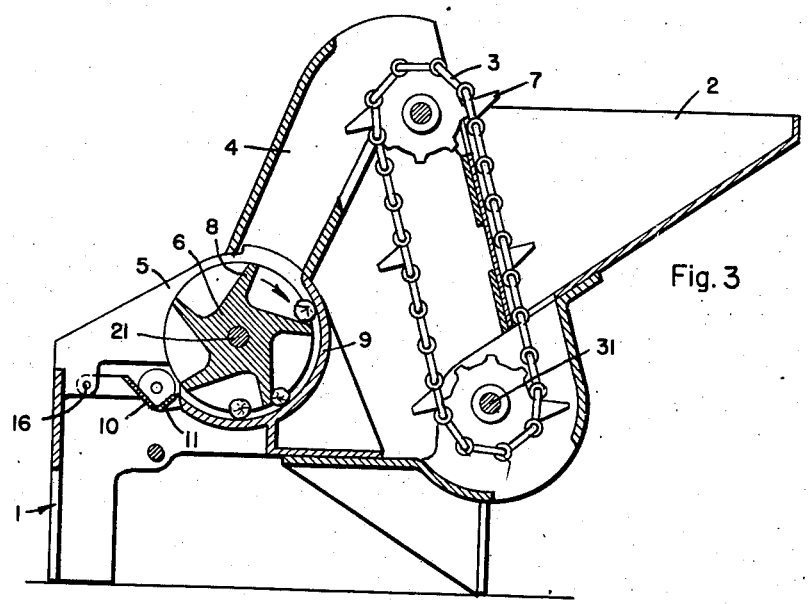
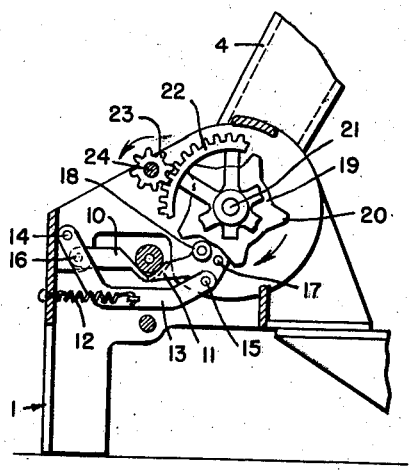
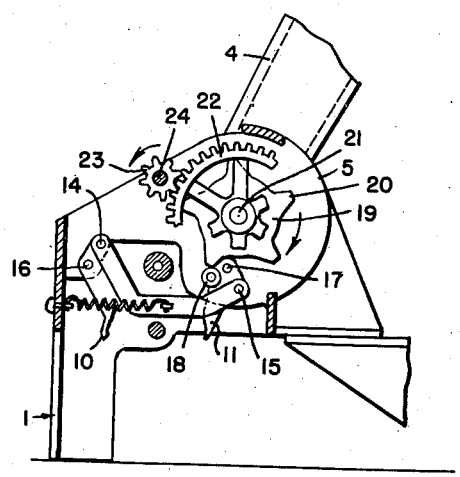

May 25, 1943.  L. K. MAULSBY ET AL  2,319,820
NUT CRACKING MACHINE
Filed March 5, 1942    3 Sheets-Sheet 3

INVENTORS
Leon K. Maulsby
John A. McGrann

Patented May 25, 1943

2,319,820

UNITED STATES PATENT OFFICE 2,319,820

NUTCRACKING MACHINE

Leon K. Maulsby and John A. McGrann, San Antonio, Tex.; said McGrann assignor to said Maulsby Application March 5, 1942, Serial No. 433,412

1 Claim. (Cl. 146—12)

This invention relates to a machine of the character disclosed in Patent No. 2,226,475 granted on an application filed by Delbert La Ferney said invention being assigned to Leon K. Maulsby and said Letters Patent being issued to said Leon K. Maulsby on the 24th day of December, 1940. The invention also relates to a machine of the character disclosed in Patent No. 2,273,759 granted to Leon K. Maulsby on the 17th day of February, 1942.

An object of the present invention is the provision of means for delivering the nuts into position between the cracking dies of the machine in such manner that the longitudinal axis of the nut will be in alignment with the longitudinal axis of the cracking dies. In the pecan shelling industry, for which this machine is particularly suited, it has been found that when the longitudinal axis of the nut is in alignment with the longitudinal axis of the cracking dies and the proper crushing travel of the die is proportioned to correspond with the length of the nut that the nut kernels are easily separable from the fragments of the crushed shell. However, if the long axis of the nut is not in alignment with, and centered with, the direction of the crushing force exerted by the dies a "cripple" crack is produced and removal of the nut kernels from the shell fragments is extremely difficult. Obviously, any means of aligning and centering the long axis of the nut with relation to the direction of the crushing force will facilitate the removal of the nut kernels from the shell fragments and increase the quantity of kernels recovered from the shell fragments thus resulting in reduced operating costs and a more complete shelled kernel.

Another object of the invention is the provision of means whereby the nuts are delivered into position between the cracking dies with a minimum of agitation. If the nut is delivered into position between the cracking dies at a relatively high velocity, or if the element employed for aligning the nut with the dies is in motion, the nut will be subject to a certain amount of agitation which will, in many instances, result in mis-alignment of the long axis of the nut with the longitudinal axis of the cracking dies. It has been found, in practice, that any motion of the nut at the time of contact with the cracking die may result in mis-alignment of the nut with the dies and thereby produce an imperfect crush to the shell. By delivering the nut into position between the cracking dies and depositing the nut into a centering element at low velocity and with a rolling motion it is assured that the nut will be motionless when it is contacted by the cracking dies.

A further object of the invention resides in the provision of friction locking means between the carriage and slide of the machine whereby all ratchets, pawls, racks and pinions may be eliminated and in which the variations of crush travel will not be limited by the pitch of such ratchet teeth, as at present. It has been found during the construction of the machine disclosed in the above mentioned Patents No. 2,226,475 and No. 2,273,759 that a large amount of time and labor was consumed in the installation of the various ratchets, pawls, racks and pinions and, furthermore, the increments of crush travel imparted to the cracking die depended upon the pitch of the ratchet teeth and, even though a vernier arrangement of the pawls was employed, the increments of crush travel was not always proportional to the length of the nut being cracked. Furthermore, if the ratchet teeth and their engaging member were not in near perfect alignment, slippage occurred which resulted in an imperfect crack to the nut and stripping of the teeth in the ratchet lock means. By the provision of friction locking means herein disclosed, the time and labor required for the construction of the machine is substantially reduced and, since, this is a friction lock, the increments of crush travel of the cracking die will not be dependent upon the pitch of ratchet teeth but will, at all times, be proportional to the length of the nut being cracked.

A further object of the invention is the provision of a locking mechanism whereby the replacement of the locking element, after becoming worn or damaged, may be made by the operator of the machine at a minimum of expense. In the prior types of machines the entire ratchet and ratchet engaging member, whether said ratchet was located on the slide or on a pinion shaft, required renewal of the component parts after wear, or strippage of the ratchet teeth. In the locking mechanism described in the following specification the only part required for repair of the locking mechanism is a renewal of the slide encompassing member. This part may be carried in stock and when slippage of the locking means occurs, due to wear over an extended period of service, the worn part may be discarded and a new part substituted. The procedure of renewing a worn lock element thus involves no expensive machine work on any of the lock parts during the time replacement is being made and, substantially reduces the period of time in which the machine is inoperative owing to such replacements.

Other objects and advantages will be apparent during the course of the following specification.

These objects are accomplished as described in the following specification and illustrated in the accompanying drawings in which like reference characters refer to like parts throughout the various views.

In the drawings:

Fig. 3 is a vertical sectional view taken on the line 3—3 Fig. 2.

Fig. 4 is a vertical sectional view taken on the line 4—4 Fig. 2.

Fig. 5 is a sectional view similar to Fig. 4 but showing an alternate position of the component parts.

Figure 1:
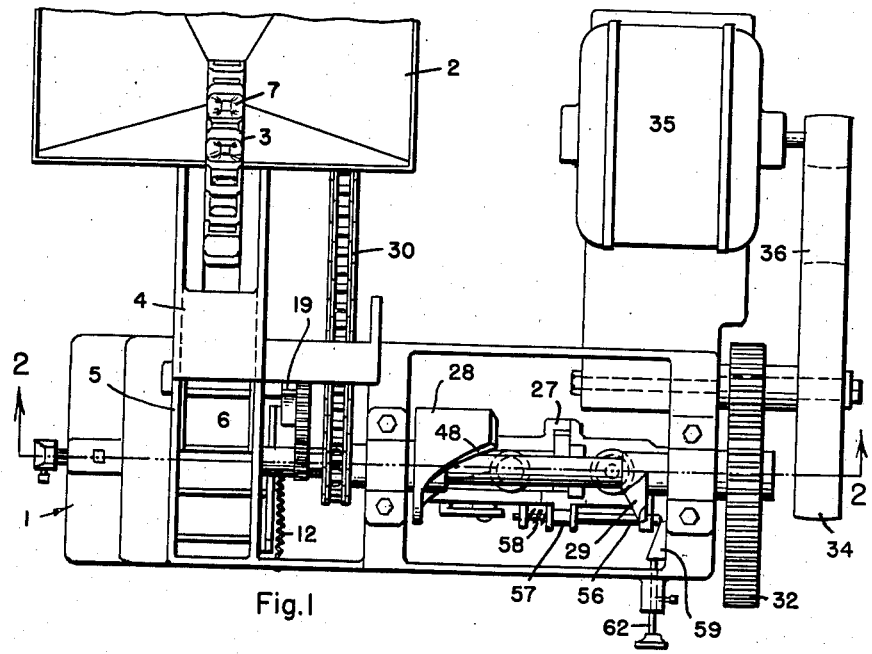
Fig. 1 is a plan of the machine, with the rear portion of the hopper broken away.
Figure 2:
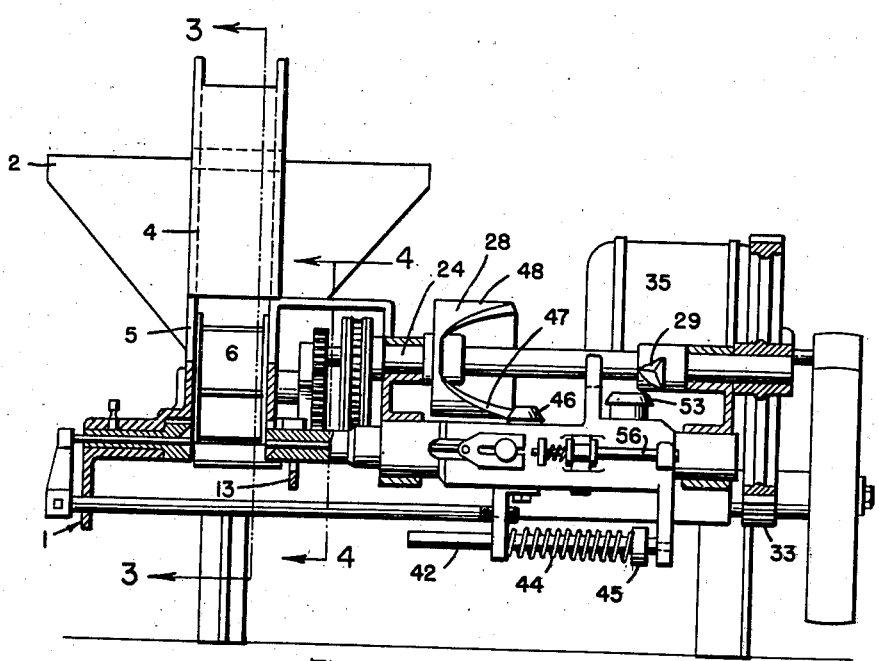
Fig. 2 is a vertical sectional view, partly in elevation, taken on the line 2—2 Fig. 1.

In describing the invention, attention is first invited to Figs. 1, 2 and 3 in the drawings. In these figures it will be noticed that a base, generally denoted by the numeral 1, acts as a support for a hopper 2 from which the nuts are transported, by means of a conveyor chain 3 to a chute 4 leading to a housing 5 forming an integral portion of the base 1 which housing partially encloses a nut delivery wheel 6 rotating in the direction indicated by the arrows in the various views.

In operation of the machine the nuts are conveyed singly from the hopper 2 and deposited into the chute 4 leading to the housing 5. The timing of the chain 3 and the spacing of the cups 7 is such that each nut deposited into the chute 4 will enter the housing 5 at the required time interval to land between adjacent blades 8 of the wheel 6 so that only one nut will occupy the space between any two adjacent blades at one time. This timing and spacing of the cups 7 of the chain 3 is necessary in order that only one nut at a time will be delivered to the cracking dies of the machine. Obviously, if more than one nut at a time is delivered to the cracking dies an improper crush to the nut shells will result.

After entering the housing 5 between adjacent blades 8 of the wheel 6 the nut follows the blade of the wheel around the wheel enclosing periphery 9 until it reaches the lowermost position therein whereupon it comes to rest until the succeeding blade of the wheel 6 engages the nut and, in a rolling action, carries the nut to the limit of the enclosing periphery and deposits it into a pair of trough-like traps 10 and 11 respectively which center the nut in proper relation to the cracking dies.

The object of depositing the nuts from the chute 4 into a housing and rotating wheel assembly, instead of delivering the nuts directly from the chute 4 to the traps 10 and 11, is to decrease the velocity of the nuts as they approach the traps and, by the rolling effect of the blades 8 of the wheel 6 and the periphery 9 of the housing 5, to bring the long axis of the nuts into alignment with the direction of crushing force exerted by the cracking dies.

Since the long axis of the nut, in its travel through the wheel 6 and the housing 5, is brought into parallel alignment with the direction of crush exerted by the cracking dies and as the movement of the nut after leaving the blade 8 of the wheel 6 until it settles in the traps 10 and 11 is negligible the nut will come to rest, and be centered in the traps 10 and 11, at a low velocity and with a minimum of agitation. Thus, the longitudinal axis of the nut will be in alignment with, and center with, the crushing action of the cracking dies.

It has been found, in the art of cracking pecans, that any restraining force against the sides of the nut during the time the longitudinal crushing force is being applied to the nut will result in an imperfect crush to the shell and render the kernels difficult to remove from the shell fragments. For this reason, the traps 10 and 11, which serve to center the nut with relation to the cracking dies, are timed to move out of engagement with the nut immediately upon, or slightly preceding, the crushing force exerted by the dies. This timing of the traps 10 and 11 may be explained with reference to Figs. 3, 4 and 5 of the drawings, in which Figs. 3 and 4 represent corresponding views of the trap positions at the beginning of the forward movement of the cracking die. In Figs. 3 and 4 the traps are shown in what may be termed a normally closed position and are held in this position by a spring 12, attached at one end to the base 1 of the machine and at its other end to a connecting link 13 connecting bell-cranks and pivoted at the points 14 and 15 respectively of the traps 10 and 11. The traps 10 and 11 are pivoted to the frame 1 and the housing 5 of the machine at the points 16 and 17 respectively. Thus, the action of the spring 12 on the connecting link 13 serves to hold the traps 10 and 11 normally in the positions shown in Figs. 3 and 4.

The trap 11 is provided with a roller 18 engageable with a multiple cam 19, the rises 20 of which correspond in number with the number of blades 8 in the wheel 6. The cam 19 is mounted on a shaft 21, upon which shaft is also mounted the wheel 6 and the gear 22, driven by the pinion 23 mounted on the main drive shaft 24 of the machine. Thus, the cam 19 being timed with the main drive shaft 24, which governs the movement of the cracking dies, controls the movement of the traps 10 and 11 so that the traps 10 and 11 occupy their closed positions, as shown in Figs. 3 and 4 until contact of the nut by the cracking die whereupon the traps recede from contact with the nut and assume their open positions until after the cracking die has reached its furthermost position from the mating die in order to give the crushed nut time to be discharged beneath the machine. The peripheral dwell of the cam rises 20 is proportioned to allow only sufficient time for discharge of the crushed nut whereupon it disengages with the roller 18 and allows the traps 10 and 11 to assume their closed positions preparatory to receiving the next nut.

It is apparent from the foregoing explanation, that the timing of the chain 3, the wheel 6 and the cam 19 must all be synchronized with the drive shaft 24 in order to secure a proper delivery, crushing action and discharge of the nut from the machine.

The foregoing functions may be enumerated in the following manner. First: The nut must be delivered into position between the cracking dies with its long axis parallel to, and with centered relation to the cracking dies; Second: The nut must be delivered into its cracking position in such manner that it will be practically stationary upon contact with the cracking die; Third: The traps must recede from the nut immediately upon, or slightly prior to, the application of the crushing force by the dies; Fourth: The traps must remain in their open position long enough to permit discharge of the crushed nut and, Fifth: The traps must resume their closed positions prior to beginning of travel of the cracking die on its crushing stroke in order to receive the succeeding nut.

Figure 9:
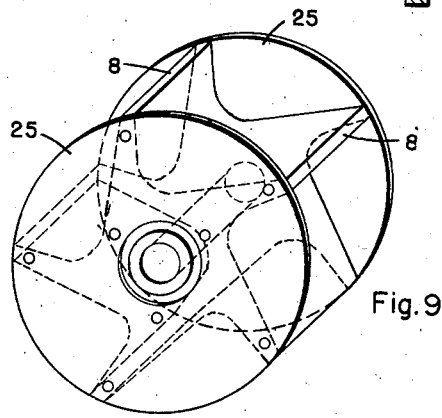
Fig. 9 is an enlarged perspective view of the nut delivery wheel.

The wheel 6 is preferably constructed as shown in the perspective view of Fig. 9. Here, it will be noticed that the spaces between the blades 8 at the sides of the wheel are enclosed by thin discs which may be either bolted or riveted to the sides of the wheel 6. It has been found that when the spaces between the blades 8, at the sides of the wheel, are left open that the nuts, in their rolling motion through the housing 5, would occasionally roll into contact with the stationary sides of the housing and when this occurred the nuts were thrown out of proper alignment with the cracking dies of the machine. By enclosing the sides of the wheel the nut, in rolling to either side, will contact one of the moving discs 25 which will act as a pivot for the ends of the nuts.

Figure 7:
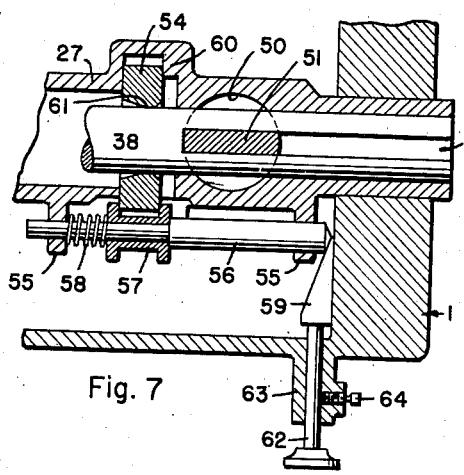
Fig. 7 is a sectional view, partly in elevation, taken on the line 7—7 Fig. 6.
Figure 8:
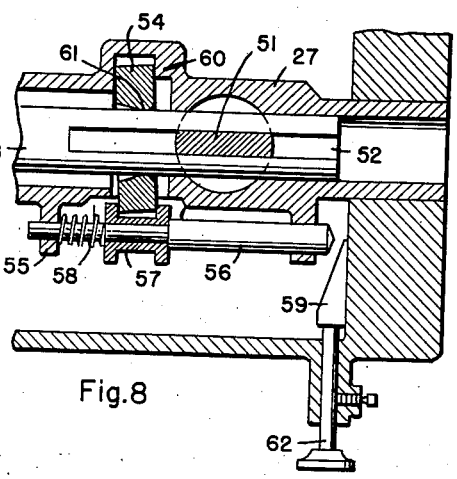
Fig. 8 is a view similar to Fig. 7 but illustrating the relative positions of the parts when the slide and carriage of the machine are in locked relation during the crushing action.
Figure 6:
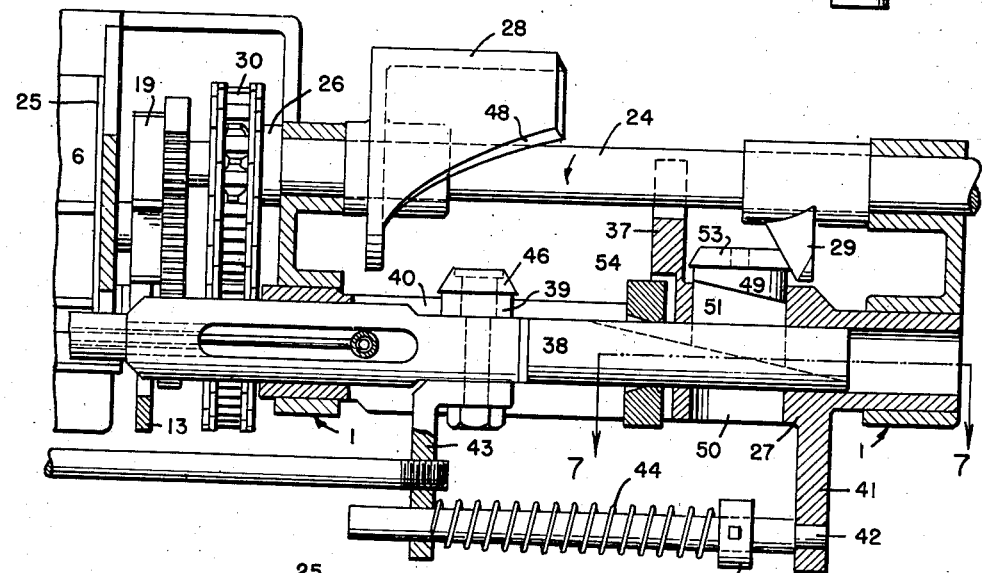
Fig. 6 is an enlarged sectional view, partly in elevation, and corresponding somewhat to the right hand end of Fig. 2.

Attention is here invited to Figs. 6, 7 and 8 which views illustrate the various actuating elements for the cracking die. In Fig. 6 it will be seen that the main drive shaft 24 of the machine and a carriage 27 are mounted in parallel bearings in the base 1. The shaft 24 rotates in the direction indicated by the arrow and is provided with a pair of cams 28 and 29 whose functions will be explained later. The left hand end of the shaft 24 carries the pinion 23 and a sprocket 26, the pinion 23 meshing with the gear 22 to form the driving means for the cam 19 and the wheel 6 while the sprocket 26 is connected by means of the chain 30 to a sprocket on the drive shaft 31 (Fig. 3) for driving the conveyor chain 3. The main drive shaft is driven by means of a gear 32, a pinion 33 and a pulley 34 connected to the motor 35 by the belt 36. Thus, the drive for the conveyor chain 3, the wheel 6, the cam 19 and the two cams 28 and 29 is completed.

The carriage 27 is mounted for axial movement in the base 1 and, while the bearings at each end of the carriage are round, a fork 37 engaging with the drive shaft 24 prevents any rotative movement of the carriage. A slide 38 is mounted for sliding movement in a bore of the carriage 27 and is prevented from rotating by a block 39 projecting upwardly from the slide and extending through a slot 40 in the upper portion of the carriage 27. For convenience in describing the actions of the slide and carriage their left hand positions will hereinafter be called their forward positions while their right hand positions will be called their rearward positions. Projecting downwardly from a point near the rear end of the carriage 27 is an arm 41 into which is loosely fitted the rear end of a spring guide rod 42. The forward end of the rod 42 is slidably supported in an arm 43 connected to, and extending downwardly from, the slide 38. The compression spring 44 is guided by the rod 42 and is held in contact with the arm 43 by the set collar 45 on the rod 42 thus securing a spring adjustment.

An examination of Figs. 2 and 6 will show that the action of the spring 44 between the arms 41 and 43 will normally tend to hold the carriage in its rearmost position and to hold the slide 38 in its foremost position. The reciprocal movement of the slide 38 is controlled by the cam 28 acting in conjunction with the roller 46, the land 47 of the cam 28 allowing the spring 44 to move the slide forwardly and the land 48 returning the slide against the resistance of the spring 44. The forward dwell of the cam 28 provides the time necessary for locking of the slide and carriage and crushing of the nut, as will be explained later. The rear dwell of the cam 28 serves to retain the slide 27 in its rearmost position until sufficient time has elapsed for discharge of the crushed nut from the dies, closing of the traps 10 and 11, and admission of the succeeding nut to the traps.

Since the cam 28 merely allows the slide 27 to move forwardly until engagement of the nut by the cracking die and then returns the slide to its rearmost position against the resistance of the spring 44 the following means is employed to impart the crushing force to the cracking die: Toward the rear end of the carriage 27 is provided a block 49 mounted for vertical sliding movement in the carriage 27. The body of the block 49 fits into the circular bore 50 of the carriage while the lower portion 51 of the block is flattened and tapered on its lower face to correspond with a tapered keyway 52 cut in the rear end of the slide 27. The upper end of the block 49 is provided with a roller 53 disposed in the path of the cam 29 on the drive shaft 24. An examination of Fig. 6 will show that the height of the roller 53 depends upon the relative positions of the slide and carriage of the machine. Thus, when the slide occupies its rearmost position the roller 53 will occupy its uppermost position and when the slide occupies its foremost position the roller 53 will be in its lowermost position. Obviously, the longer the nut being cracked the more rearward will be the position of the slide when the die contacts the nut and the higher will be the position of the roller 53. This is as it should be since the inclined face of the cam 29 imparts a length of crush travel to the slide and carriage that is proportional to the height of the roller 53. Therefore, the greater the length of the nut, the greater will be the length of crush travel imparted to the slide and carriage and, consequently, to the nut. This governing of the amount of crush imparted to the nut to correspond with its length is explained in Patent No. 2,273,759 granted to Leon K. Maulsby on the 17th day of February, 1942.

The slide 38 and the carriage 27 are in locked relation during the time the shell of the nut is being crushed and this locking action is accomplished as illustrated in Figs. 6 to 8 inclusive of the drawings. In these figures it will be seen that a locking member 54 is interposed between the carriage 27 and the slide 38, the member 54 being a close sliding fit on the slide 38 but relatively loose in the carriage 27. The locking member 54 is shown in the drawings as being a ring-like member and has been likewise employed in the actual machine owing to simplicity of construction. However, it is to be understood that the slide 38 and the locking member 54 might be square, or any other desired shape, without affecting the principle of operation. An inspection of Figs. 7 and 8, which are horizontal sectional views taken on the line 7—7 Fig. 6, will show that the lock 54 is confined against any appreciable axial movement by the walls of the carriage on one side while on the opposite side of the carriage the wall is cut away to allow a substantial amount of axial movement of the lock 54 in a rearward direction. The walls of the carriage governing the foremost positions of each side of the lock 54 are formed so that a line drawn from the face of one wall to the face of the opposite wall will be perpendicular with the axis of the slide 38. From the side of the carriage 27 on which the lock 54 has its axial play a pair of supports 55 are provided in support of the slidably mounted pin 56. The pin 56 carries a flanged member 57 the flanges of which engage opposite sides of the lock 54 at its periphery for governing the position of that extremity of the lock. Interposed between the forward support 55 and the flanged member 57 is a light compression spring 58 tending to hold the pin 56 and the flanged member 57 normally in their rearmost positions. Since the spring 44 (Fig. 6) is much stronger than the spring 58 and since the spring 44 holds the carriage 27 in its rearmost position at all times except when the cam 29 is in engagement with the roller 53 the position of the various parts governing the position of the lock 54 will be as shown in Fig. 7 where the carriage is shown in its rearmost position with the rear end of the pin 56 in abutment with a wedge shaped stop 59. Thus, when the carriage is in this position the forward faces of the lock 54 will be perpendicular with respect to the axis of the slide 38 and the slide can move freely through the lock 54. However, immediately upon engagement of the cam 29 with the roller 53 for imparting the crush to the nut the carriage begins its forward motion and the action of the spring 58 on the flanged member 57 causes the lock 54 to assume the position shown in Fig. 8 thereby throwing the lock 54 out of perpendicular alignment with the slide 38 and causing a binding action between the lock 54 and the slide 38. Then, as the cam 29 continues to act against the roller 53 and move the carriage forward the only portion of the carriage 27 that is in contact with the lock 54 is the projection 68 located at a side of the lock 54 opposite the flanged member 57. Obviously, the greater the force required for crushing the nut the tighter will the lock 54 grip the slide 38.

Immediately upon passage of the cam 29 from engagement with the roller 53, upon completion of the crush, the spring 44 again returns the carriage to its rearmost position whereupon the rear end of the pin 56 in striking against the stop 59 will serve to compress the spring 58 and return the lock 54 into alignment with the slide 38. The land 48 of the cam 28 acting against the roller 46 mounted on the slide then easily returns the slide to its rearmost position against the resistance of the spring 44 thus completing the cycle of operations.

It should be noted here that the actual bearing surface of the lock 54 against the slide 38 is comparatively narrow since a wide bearing surface would prevent sufficient gripping power between the lock 54 and the slide 38. The only reason the lock 54 is made wider at any other point is to provide the necessary strength against bursting stresses induced in the lock during the crushing of the nut.

It has been found that different operators of cracking machines require varying proportions of crush for the nut, owing to variations in preconditioning the nut and to the variations of nut types. For this reason the stop 59 has been made wedge-shaped and provided with an extension 62 extending through a bearing 63. A set screw 64 is provided in the bearing 63 for securing the stop 59 in position after it is once set. In this construction moving the stop 59 inwardly will decrease the proportional amount of crush imparted to the nut while moving the stop 59 outwardly will increase the proportional amount of crush imparted to the nut.

It is to be understood that while the preferred construction of the invention is disclosed herein that such changes may be made in various models of the machine as do not depart from the spirit of the invention.

Having thus described the invention what is claimed and desired to secure by Letters Patent of the United States is:

In combination, in a nut cracking machine, a drive shaft, a carriage in parallel alignment with said drive shaft said carriage being mounted for longitudinal movement with relation to said drive shaft, a slide mounted in said carriage for longitudinal movement with relation to said carriage and said drive shaft, resilient means interposed between said carriage and said slide tending to hold said carriage in one direction and said slide in the opposite direction, a cam on said drive shaft governing in combination with said resilient means the longitudinal movement of said slide, a second cam on said drive shaft disposed to engage a roller mounted in said carriage for imparting longitudinal motion to said carriage, locking means between said slide and carriage said locking means consisting of a ring closely fitting the diameter of said slide and with a comparatively narrow axial bearing surface on said slide, an internal enlargement in said carriage for the reception of said ring the internal ends of said enlargement being in perpendicular alignment with the axis of said slide at one end thereof for holding the axis of said ring in alignment with the axis of said slide and the opposite end of said enlargement being provided with a shoulder engageable with one portion only of the periphery of said ring, means normally holding said ring in contact with said perpendicular end of said internal enlargement and securing true alignment of said ring with said slide and means opposed to said shoulder in said internal enlargement for moving that portion of said ring periphery out of engagement with the perpendicular end of said internal housing enlargement and into engagement with said shoulder to produce a mis-alignment between said ring and said slide whereby the action of said shoulder against the periphery of said ring will serve to lock said slide with relation to said carriage upon movement of said carriage.

LEON K. MAULSBY.
JOHN A. McGRANN.